(12) United States Patent
Moriwaki (10) Patent No.: US 8,964,159 B2
(45) Date of Patent: Feb. 24, 2015

(54) DISPLAY DEVICE AND METHOD FOR MANUFACTURING THE SAME

(75) Inventor: Hiroyuki Moriwaki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 93 days.

(21) Appl. No.: 13/695,480

(22) PCT Filed: Apr. 6, 2011

(86) PCT No.: PCT/JP2011/002048
§ 371 (c)(1),
(2), (4) Date: Oct. 31, 2012

(87) PCT Pub. No.: WO2011/145258
PCT Pub. Date: Nov. 24, 2011

(65) Prior Publication Data
US 2013/0050605 A1    Feb. 28, 2013

(30) Foreign Application Priority Data

May 18, 2010   (JP) .................................. 2010-113918

(51) Int. Cl.
*G02F 1/1345*    (2006.01)
*G02F 1/1339*    (2006.01)
*G02F 1/1341*    (2006.01)

(52) U.S. Cl.
CPC ............ *G02F 1/1339* (2013.01); *G02F 1/1341* (2013.01); *G02F 1/1345* (2013.01)
USPC ......................................................... 349/153

(58) Field of Classification Search
USPC ........................................................ 349/153
See application file for complete search history.

(56) References Cited

U.S. PATENT DOCUMENTS 4,640,583 A * 2/1987 Hoshikawa et al. .......... 349/153
5,905,559 A * 5/1999 Fujiwara et al. .............. 349/190

FOREIGN PATENT DOCUMENTS

| JP | 2005-181514 A | 7/2005 |
| JP | 2005-216663 A | 8/2005 |
| JP | 2008-233727 A | 10/2008 |
| JP | 2008-310188 A | 12/2008 |

OTHER PUBLICATIONS

An International Search Report, dated Jun. 7, 2011, issued in International Application No. PCT/JP2011/002048.

* cited by examiner

*Primary Examiner* — James Dudek
(74) *Attorney, Agent, or Firm* — Lowe Hauptman & Ham, LLP (57) ABSTRACT

In an outer peripheral part between a first substrate and a second substrate of a liquid crystal display device 10, a first sealing material containing sealing material ingredients including ground glass fibers and conductive beads is arranged in a frame shape so as to surround a display region. In a region inside relative to the first sealing material and outside the display region, a second sealing material which does not contain the sealing material ingredients is arranged.

10 Claims, 8 Drawing Sheets

DISPLAY DEVICE AND METHOD FOR MANUFACTURING THE SAME

RELATED APPLICATIONS

The present application is a National Stage of PCT/JP2011/002048, filed Apr. 6, 2011 and claims priority from, Japanese Application No. 2010-113918, filed May 18, 2010.

TECHNICAL FIELD

The present invention relates to a display device such as a liquid crystal display device and a method for manufacturing the display device. In particular, the present invention relates to narrowing of a frame region of the display device.

BACKGROUND ART

In recent years, a need is growing for expansion of a display region of a display device such as a liquid crystal display device.

In a display panel, two substrates (i.e., an array substrate and a counter substrate) are arranged so as to face each other, and are bonded together by a sealing material applied in a frame shape along outer peripheral edges of the substrates. A display region where an image is displayed is formed inside relative to the frame-shaped sealing material. In order to expand the display region of the display device, research and development have been made for narrowing of a frame region around the display region.

The sealing material contains, e.g., glass spacers such as ground glass fibers and/or conductive beads as sealing material ingredients (see, e.g., Patent Documents 1 and 2). The ground glass fibers function as spacers configured to constantly maintain a distance between the substrates to control a cell thickness. The ground glass fibers each have a fiber diameter which is set corresponding to the distance between the substrates. The conductive beads function as transfer members configured to allow vertical conduction between a common electrode provided so as to cover the entirety of the counter substrate and a drive circuit provided in the frame region of the array substrate.

For the narrowing of the frame region, the width of the sealing material may be decreased, or the area of a region other than the sealing material may be decreased (e.g., the area of a region between a sealing region and the display region is decreased).

CITATION LIST

Patent Document

PATENT DOCUMENT 1: Japanese Patent Publication No. 2008-310188
PATENT DOCUMENT 2: Japanese Patent Publication No. 2005-216663

SUMMARY OF THE INVENTION

Technical Problem

In the case where the frame region is narrowed by decreasing the width of the sealing material, the following disadvantages are caused: bonding between the substrates is weakened due to insufficient sealing strength; and external air enters inside relative to the sealing material due to an insufficient sealing material barrier for blocking external air from entering inside relative to the sealing material, and therefore display properties are degraded. Thus, in order to compensate for lack of the bonding strength and the barrier, after a drive circuit such as a multi-chip system-on film (SOF) is mounted on a terminal region of the substrate, molding resin may be applied so as to seal end parts of the substrates. However, the following disadvantages are caused: productivity is decreased because it is necessary to apply molding resin to outer peripheral parts of the substrates; and a rework is not possible because molding resin is directly applied onto the drive circuit, and therefore a yield rate is decreased.

In the case where the frame region is narrowed by decreasing the area of the region between the sealing material and the display region, a region including interconnection parts provided for gate lines and sources lines in part of the frame region near the display region may overlap with the sealing region. If the sealing region includes the interconnection parts, the following disadvantages are caused: interconnection electrodes are damaged by the ground glass fibers contained in the sealing material; and current leaks from the interconnection electrodes and an electrode on the counter substrate through the conductive beads, and therefore display performance is degraded. Thus, there is a limitation in the decrease in area of the region between the sealing material and the display region.

It is an objective of the present invention to narrow a frame region of a display device without degrading display properties.

Solution to the Problem

A display device of the present invention includes a first substrate including a plurality of first lines extending parallel to each other in a display region, and a plurality of second lines provided above the first lines and below an insulating film and extending parallel to each other in the display region; and a second substrate arranged so as to face the first substrate. In an outer peripheral part between the first and second substrates, a first sealing material containing sealing material ingredients including a ground glass fiber and/or a conductive bead is arranged in a frame shape so as to surround the display region. In a region inside relative to the first sealing material and outside the display region, a second sealing material containing no sealing material ingredients is arranged.

According to the foregoing configuration, the second sealing material provided in the region inside relative to the first sealing material does not contain the conductive beads as the sealing material ingredients. Thus, even if lines and electrodes are provided on the first substrate and the second substrate in a region where the second sealing material is arranged, current does not leak from the lines and the electrodes provided on the substrates through the conductive beads, and occurrence of a line defect upon an image display can be reduced.

According to the foregoing configuration, the second sealing material provided in the region inside relative to the first sealing material does not contain the ground glass fibers G as the sealing material ingredients. Thus, even if lines, electrodes, etc. are exposed on the substrates in the region where the second sealing material is arranged, damage such as scratching of such components by the glass is not caused.

According to the foregoing configuration, the second sealing material provided in the region inside relative to the first sealing material does not contain the ground glass fibers as the sealing material ingredients. Thus, even in the case where protrusions etc. are provided on the substrates in the region where the second sealing material is arranged, a non-uniform cell thickness is not caused.

Since the second sealing material which does not contain the sealing material ingredients is arranged in the region inside relative to the first sealing material, e.g., the current leakage and damage of the lines and the electrodes and the non-uniform cell thickness as described above can be reduced. Thus, a large area of a region between the region where the second sealing material is arranged and the display region is not necessarily ensured, and reduction in area of the region between a sealing region of a frame region and the display region results in narrowing of the frame region.

In the display device of the present invention, the followings are preferable: the first substrate further includes, in a region outside the display region, a plurality of lead lines for the second lines, which are provided in a layer in which the plurality of first lines are provided and which extend respectively along extensions of the plurality of second lines; in the region outside the display region, interconnection parts are formed, in each of which each of end parts of the second lines is electrically connected to a corresponding one of the lead lines for the second lines through a contact hole and an interconnection electrode provided along a surface of the contact hole; and the second sealing material is arranged in a region including the interconnection parts.

In the case where the interconnection part is formed on the first substrate, the interconnection electrode and a common electrode provided on the second substrate may leak through the conductive beads which are present in a region where the interconnection part is formed, and therefore the line defect is caused upon the image display. However, according to the foregoing configuration, since the second sealing material which does not contain the conductive beads is arranged in the region including the interconnection part, occurrence of such a disadvantage is reduced.

In the case where the interconnection part is formed on the first substrate, the interconnection electrodes may be damaged by the ground glass fibers which are present in the region where the interconnection part is formed. However, according to the foregoing configuration, since the second sealing material which does not contain the ground glass fibers is arranged in the region including the interconnection part, occurrence of such a disadvantage is reduced.

In the display device of the present invention, it is preferable that the second sealing material is continuously provided in an annular shape so as to surround the display region in the region inside relative to the first sealing material and outside the display region.

According to the foregoing configuration, since the second sealing material is provided along the inner periphery of the first sealing material, e.g., the current leakage and damage of the lines and the electrodes and the non-uniform cell thickness are reduced in the entirety of the frame region of the display device. Thus, the large area of the region between the region where the second sealing material is provided and the display region is not necessarily ensured, and the reduction in area of the region between the sealing region of the frame region and the display region results in the narrowing of the frame region.

In the display device of the present invention, the first and second sealing materials may be continuously arranged without a clearance.

According to the foregoing configuration, the first and second sealing materials are continuously arranged without the clearance. Thus, no clearance between the first and second sealing materials results in reduction in area of the frame region. In such a case, since the second sealing material does not contain the sealing material ingredients, e.g., the current leakage and damage of the lines and the electrodes and the non-uniform cell thickness are reduced. Thus, the large area of the region between the region where the second sealing material is provided and the display region is not necessarily ensured, and the reduction in area of the region between the sealing region of the frame region and the display region results in the narrowing of the frame region.

In the display device of the present invention, the first and second sealing materials may be arranged at a predetermined interval.

According to the foregoing configuration, the first and second sealing materials are arranged at the predetermined interval. Thus, even if first and second sealing raw materials are applied so as to be stacked on each other on the substrate, the following is avoided: the sealing raw materials are spread by pressing and come into contact with each other, and the cell thickness cannot be controlled. In addition, since the first and second sealing materials are arranged at the predetermined interval, the first sealing raw material containing the sealing material ingredients and the second sealing raw material containing no sealing material ingredients are not mixed together even if each of the first and second sealing raw materials flows out, and the sealing material ingredients is not present in the region where the second sealing material is arranged.

In the case where the interconnection part is formed on the first substrate and the second sealing material is arranged in the region including the interconnection part, the display device of the present invention may be configured such that the second sealing material is not arranged in a region of the outer peripheral part between the first and second substrates where the interconnection parts are not formed, and part of the first sealing material arranged corresponding to the region of the outer peripheral part where the second sealing material is not arranged has a seal width greater than that of part of the first sealing material arranged corresponding to a region where the second sealing material is arranged.

According to the foregoing configuration, the second sealing material is arranged in the region including the interconnection part. Thus, occurrence of the current leakage of the interconnection electrode and the common electrode provided on the second substrate and the damage of the interconnection electrode is reduced. As a result, the large area of the region between the region where the second sealing material is provided and the display region is not necessarily ensured, and the reduction in area of the region between the sealing region of the frame region and the display region results in the narrowing of the frame region. In addition, the first sealing material is arranged such that the seal width thereof is larger in the region where the second sealing material is not arranged than in the region where the second sealing material is arranged. Thus, even if the first and second sealing materials does not form a double sealing structure in the sealing region, sufficient reinforcement and external air blocking performance by the sealing materials can be ensured.

The display device of the present invention may be configured such that, in a middle part of the second sealing material in a width direction thereof on the second substrate, a raised rib is provided along the second sealing material and protrudes toward the first substrate with a clearance from the first substrate.

In the case where the raised rib is provided on the second substrate, it may be difficult to control the cell thickness due to the ground glass fibers which are present as spacers in a region where the raised rib is provided, and the non-uniform cell thickness may be caused. However, according to the foregoing configuration, since the second sealing material which does not contain the ground glass fibers is arranged in the region including the raised rib, occurrence of such a disadvantage is reduced.

The frame region of the display device of the present invention can be narrowed by arranging the second sealing material which does not contain the sealing material ingredients inside relative to the first sealing material and forming no region between the sealing region and the display region. Thus, the display device of the present invention can be suitably used for, e.g., a display device in which a liquid crystal layer is provided between first and second substrates.

A method for manufacturing a display device of the present invention includes arranging, on an outer peripheral part of one of the first and second substrates, a first sealing raw material containing sealing material ingredients including a ground glass fiber and/or a conductive bead in a frame shape; arranging, on one of the first and second substrates, a second sealing raw material containing no sealing material ingredients in a region inside relative to a region where the first sealing raw material is arranged and outside a display region; and obtaining, by curing the first and second sealing raw materials in a state in which the first and second substrates are stacked on each other with the first and second sealing raw materials being interposed therebetween, the display device in which the first sealing raw material containing the sealing material ingredients is arranged in the frame shape in an outer peripheral part between the first and second substrates so as to surround the display region and the second sealing raw material containing no sealing material ingredients is arranged in the region inside relative to the first sealing raw material and outside the display region.

According to the foregoing method, the display device having the configuration of the present invention can be manufactured.

Since the second sealing material which does not contain the sealing material ingredients is arranged in the region inside relative to the first sealing material, e.g., the current leakage and damage of the lines and the electrodes and the non-uniform cell thickness are reduced. Thus, the large area of the region between the region where the second sealing material is provided and the display region is not necessarily ensured, and the reduction in area of the region between the sealing region of the frame region and the display region results in the narrowing of the frame region.

In the method of the present invention, the first and second sealing raw materials are preferably arranged on one of the first and second substrates.

Advantages of the Invention

According to the present invention, since the second sealing material which does not contain the sealing material ingredients is arranged inside relative to the first sealing material, e.g., the current leakage and damage of the lines and the electrodes and the non-uniform cell thickness are reduced. Thus, the large area of the region between the region where the second sealing material is provided and the display region is not necessarily ensured, and the reduction in area of the region between the sealing region of the frame region and the display region results in the narrowing of the frame region.

DESCRIPTION OF EMBODIMENTS

An embodiment of the present invention will be described below in detail with reference to drawings. In the present embodiment, an active matrix drive type liquid crystal display device 10 including a thin film transistor (TFT) at each pixel will be described as an example of a display device. Note that the present invention is not limited to the present embodiment, and other configuration may be employed.

Figure 1:
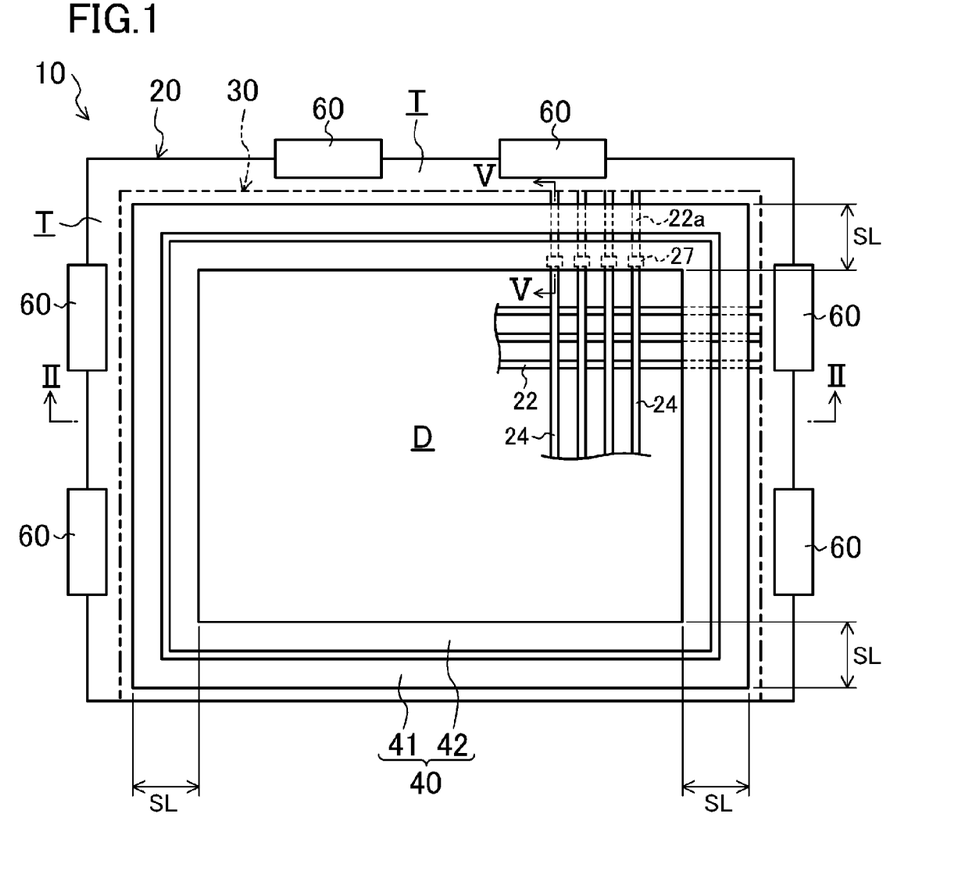
FIG. 1 is a plan view of a liquid crystal display device of an embodiment.
Figure 2:
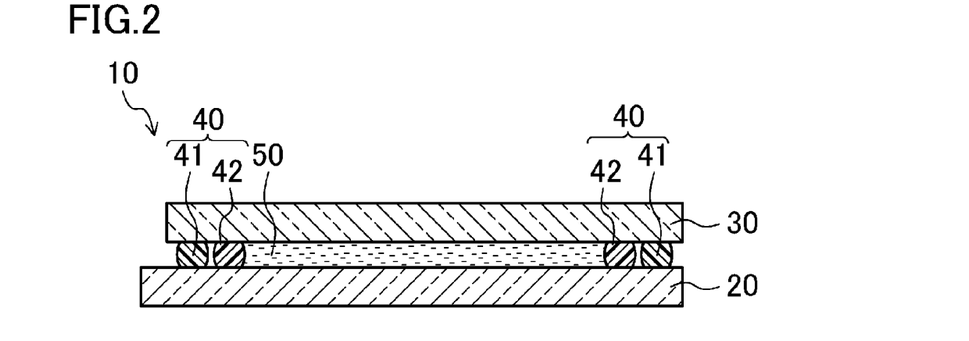
FIG. 2 is a cross-sectional view along an II-II line of FIG. 1.

FIGS. 1 and 2 illustrate the liquid crystal display device 10 of the present embodiment. The liquid crystal display device 10 includes an array substrate (first substrate) 20 and a counter substrate (second substrate) 30 arranged so as to face each other. The substrates 20, 30 are, at outer peripheral parts thereof, bonded together by a sealing material 40 applied in a frame shape in a sealing region SL. In a space surrounded by the substrates 20, 30 and the sealing material 40, a liquid crystal layer 50 is provided as a display layer. For the sake of clearly illustrating arrangement of the sealing material 40 and a layout of lines on the array substrate 20, in the plan view of the liquid crystal display device 10 of FIG. 1, the counter substrate 30 is indicated by virtual lines, and the sealing material 40 and the lines are indicated by solid lines.

The liquid crystal display device 10 has a display region D formed inside relative to the sealing material 40 and having a plurality of pixels arranged in a matrix, and a region surrounding the display region D is a frame region. Part of the frame region is a terminal region T to which external connection terminals 60 such as mount components are attached. That is, referring to FIG. 1, the liquid crystal display device 10 is formed such that at least one of edges of the array substrate 20 protrudes beyond the counter substrate 30, and such a protruding part is the terminal region T.

(Array Substrate 20)

The array substrate 20 has a publicly-known configuration. For example, referring to FIG. 1, a plurality of gate lines (first lines) 22 extending parallel to each other are provided on a substrate body 21 of the array substrate 20, and a gate oxide film 23 (see FIG. 5) is provided so as to cover the gate lines 22. On the gate oxide film 23, a plurality of source lines (second lines) 24 are provided so as to extend parallel to each other in a direction perpendicular to the gate lines 22.

In the display region D, a semiconductor layer is provided at each intersection between the gate line 22 and the source line 24, and forms a TFT (not shown in the figure). A passivation film (not shown in the figure) is provided so as to cover the foregoing components, and an interlayer insulating film 25 (see FIG. 5) is provided so as to cover the passivation film.

Figure 5:
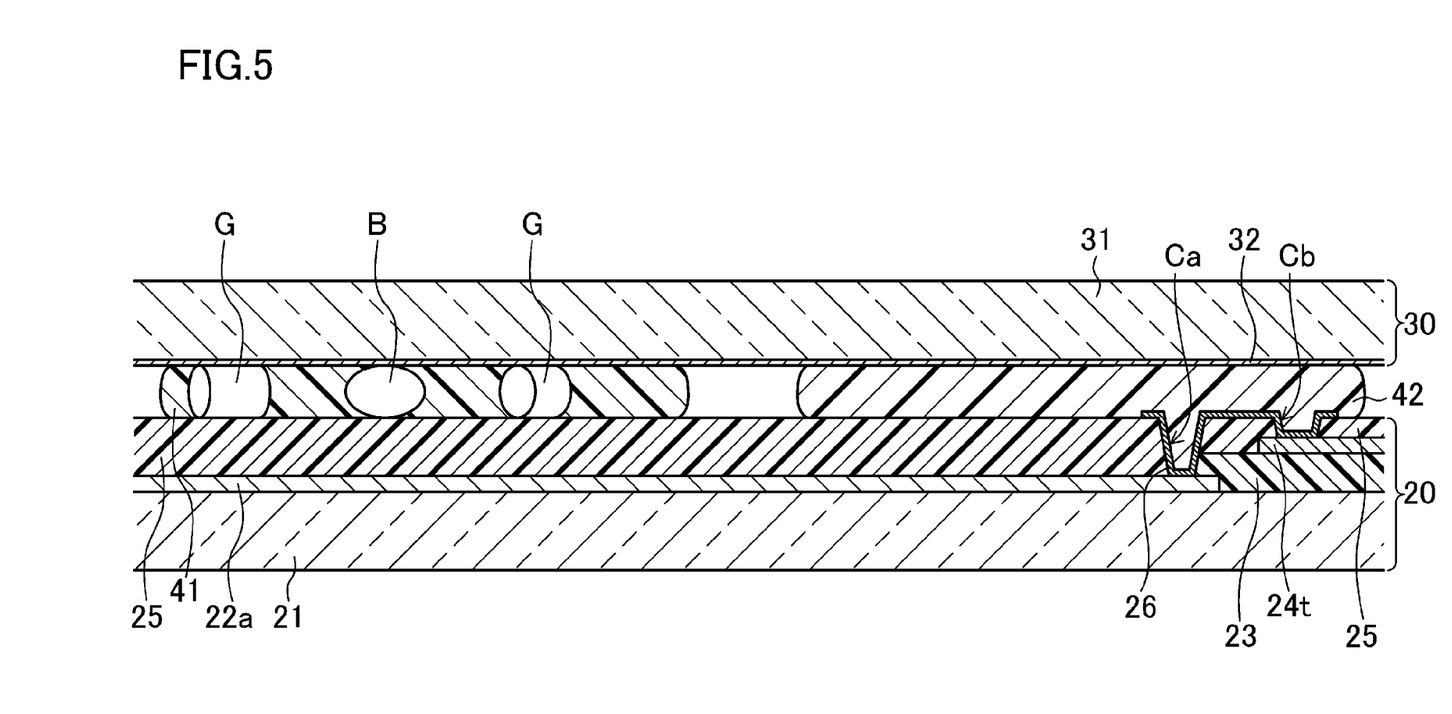
FIG. 5 is a cross-sectional view along a V-V line of FIG. 1.

A pixel electrode (not shown in the figure) having a thickness of, e.g., about 100 nm and made of, e.g., ITO is provided corresponding to each contact hole formed, at each pixel, so as to extend from a surface of the interlayer insulating film 25 to the TFT. An alignment film (not shown in the figure) having a thickness of, e.g., about 100 nm is formed on the pixel electrodes so as to cover the display region D.

Figure 3:
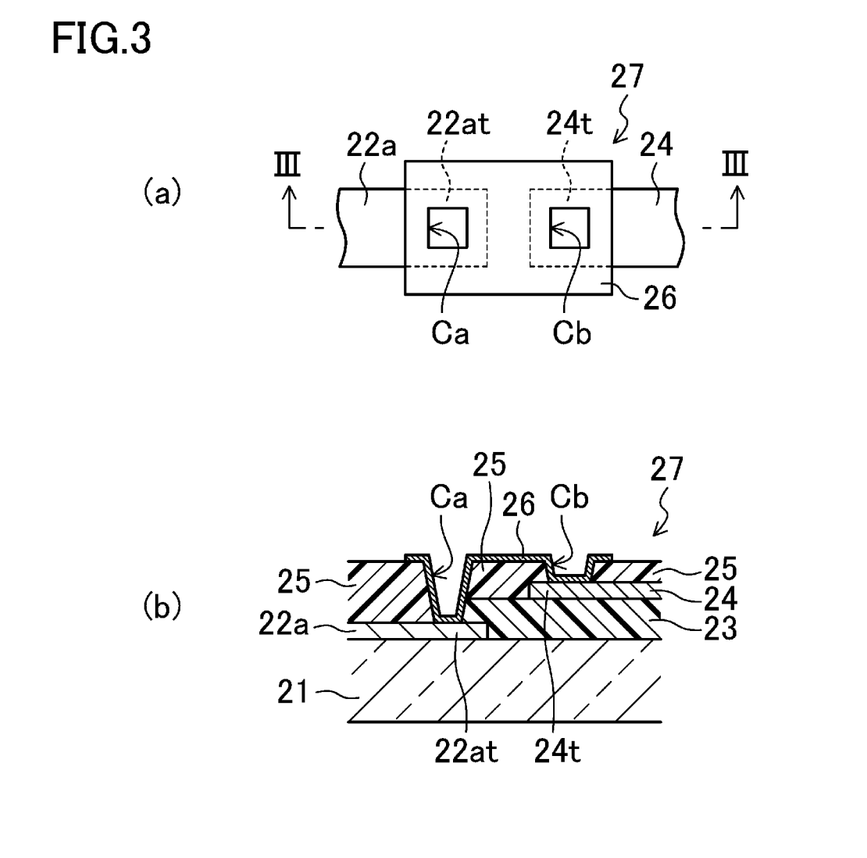
FIG. 3(a) is an enlarged plan view illustrating an interconnection part.
FIG. 3(b) is a cross-sectional view along an III-III line of FIG. 3(a).

Referring to FIGS. 3(a) and 3(b), in the frame region, the source line 24 is electrically connected to a lead line 22a provided for the source line in the same layer as that of the gate line 22. A source line end part 24t is positioned so as not to overlap with a end part 22 at of the lead line 22a for the source line as viewed in the plane. A contact hole Ca extending from a substrate surface to the end part 22 at and a contact hole Cb extending from the substrate surface to the source line end part 24t are formed. An interconnection electrode 26 is provided so as to cover the contact holes Ca, Cb, and therefore an interconnection part 27 is formed. Note that the interconnection electrode 26 is provided in the same layer as that of the pixel electrode in the display region D.

Figure 4:
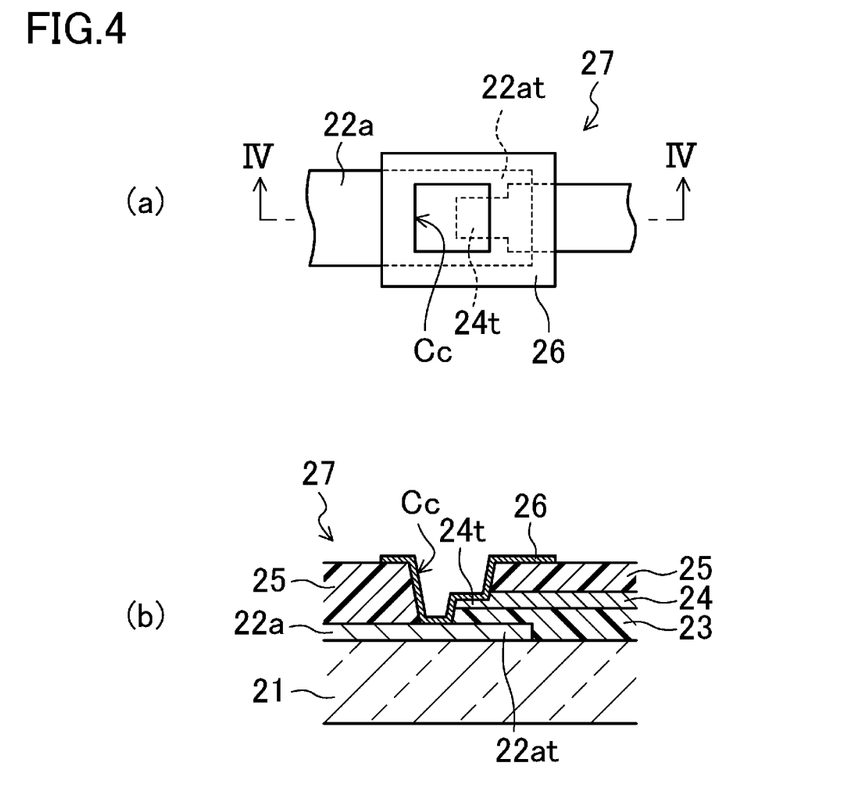
FIG. 4(a) is an enlarged plan view illustrating another interconnection part.
FIG. 4(b) is a cross-sectional view along an IV-IV line of FIG. 4(a).

Other than the foregoing configuration, the interconnection part 27 may be, referring to FIGS. 4(a) and 4(b), configured such that the source line end part 24t is positioned so as to overlap with a layer above the end part 22 at as viewed in the plane and a contact hole Cc leading to both of the source line end part 24t and the end part 22 at is formed.

(Counter Substrate 30)

The counter substrate 30 has a publicly-known configuration (see FIG. 5). For example, a color filter layer (not shown in the figure) including colored layers and a back matrix is provided in the display region D on a substrate body 31 of the counter substrate 30. A common electrode 32 having a thickness of, e.g., about 100 nm and made of, e.g., ITO is provided on the color filter layer so as to extend across the entirety of the substrate, and an alignment film (not shown in the figure) is provided so as to cover the common electrode 32.

(Sealing Material 40)

In an outer peripheral part between the array substrate 20 and the counter substrate 30, the sealing region SL is defined in an annular shape along the frame region. The sealing material 40 is arranged so as to extend along the sealing region SL. The sealing material 40 bonds the array substrate 20 and the counter substrate 30 together.

The sealing material 40 has a double sealing structure in which a first sealing material 41 and a second sealing material 42 positioned inside relative to the first sealing material 41 are each arranged so as to be continuously applied in an annular shape along the sealing region SL. The first sealing material 41 has the seal width of, e.g., about 0.8 mm, and the second sealing material 42 has the seal width of, e.g., about 0.6 mm. The second sealing material 42 is arranged, e.g., about 0.1 mm apart from the display region D. The first sealing material 41 and the second sealing material 42 are arranged, e.g., about 0.1 mm apart from each other in a seal width direction.

A first sealing raw material containing an adhesive having liquidity, such as thermoset resin or ultraviolet curable resin, as a main component is cured by heating or ultraviolet irradiation to form the first sealing material 41, and a second sealing raw material containing an adhesive having liquidity, such as thermoset resin or ultraviolet curable resin, as a main component is cured by heating or ultraviolet irradiation to form the second sealing material 42. As the adhesive, e.g., acrylic resin or epoxy resin may be used.

The first sealing material 41 contains ground glass fibers G and conductive beads B as sealing material ingredients.

Glass fibers G each having a fiber diameter of, e.g., about 4 μm are ground to form the ground glass fibers G each having a length of about 20 μm. The fiber diameter of the ground glass fiber G is set to a length corresponding to a distance between the array substrate 20 and the counter substrate 30, and therefore the ground glass fibers G function as spacers between the substrates.

The conductive beads B are, e.g., polymer beads on which gold is vapor-deposited. The conductive beads B each have an outer diameter of, e.g., about 5 μm. The conductive beads B function as transfer members configured to electrically connect the common electrode 32 of the counter substrate 30 to lines (not shown in the figure) provided in the frame region of the array substrate 20.

On the other hand, the second sealing material 42 is made of resin which does not contain the sealing material ingredients such as the ground glass fibers G and the conductive beads B.

If a light blocking region is formed by a black matrix at the outer periphery of the display region D of the counter substrate 30, a region where the second sealing material 42 is arranged may be in the light blocking region. In such a case, the second sealing raw material preferably contains not light curable resin but thermoset resin as the adhesive.

(Liquid Crystal Layer 50)

The liquid crystal layer 50 is made of, e.g., a nematic liquid crystal material having electrooptic properties.

The liquid crystal display device 10 having the foregoing configuration is configured as follows. A single pixel is formed for each pixel electrode. When a gate signal is sent from the gate line 22 to turn on the TFT at each pixel, a source signal is sent from the source line 24, and a predetermined electrical charge is applied to the pixel electrode through a source electrode and a drain electrode. Then, a potential difference is generated between the pixel electrode and the common electrode 32 of the counter substrate 30, and predetermined voltage is applied to a liquid crystal capacitor configured by the liquid crystal layer 50. In the liquid crystal display device 10, the transmissivity of light entering from outside is adjusted by using a change in alignment state of liquid crystal molecules depending on the magnitude of voltage to be applied, and, as a result, an image is displayed.

Figure 6:
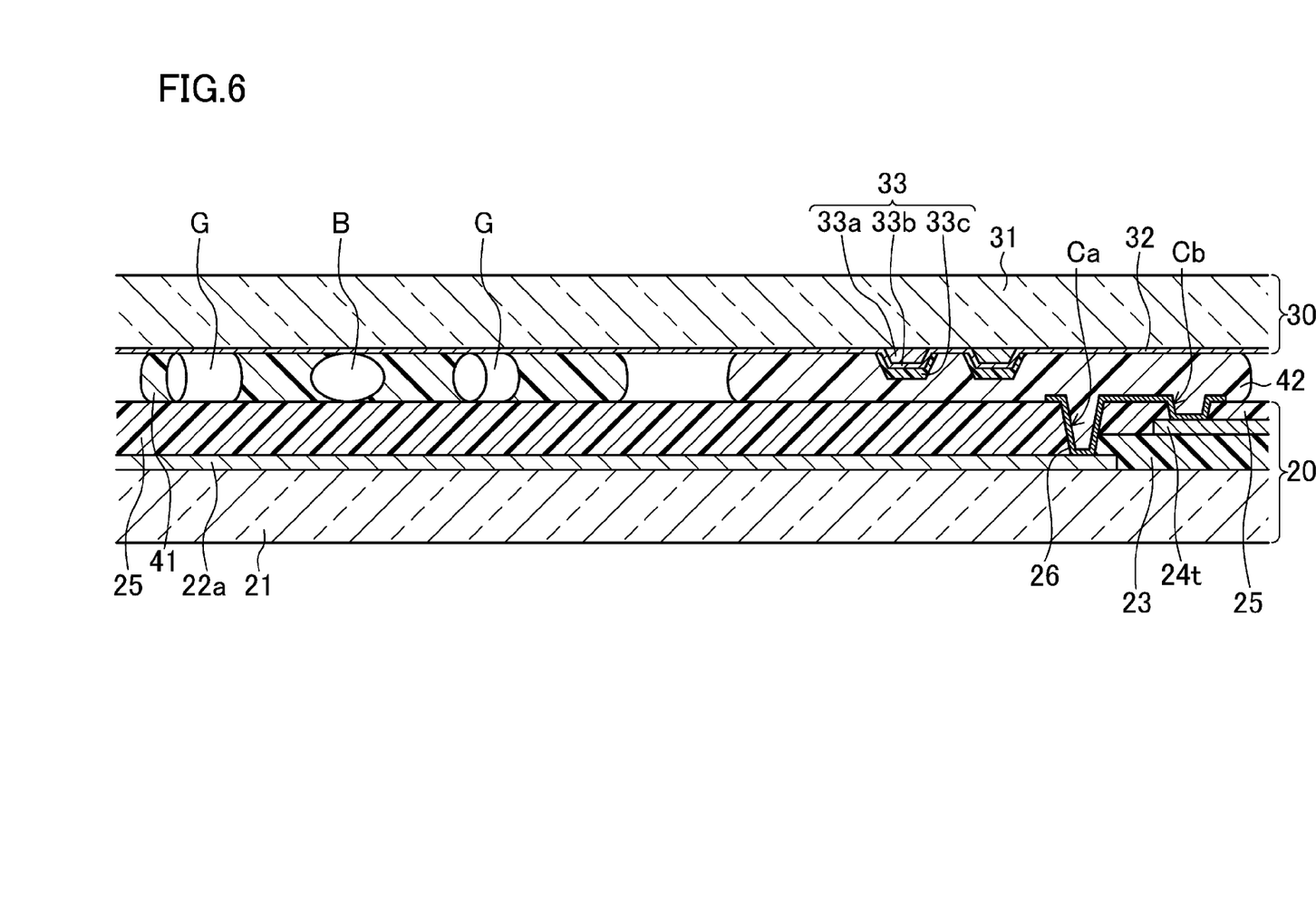
FIG. 6 is a cross-sectional view along the V-V line of FIG. 1 in the case where raised ribs are provided on a counter substrate.

Referring to FIG. 6, raised ribs 33 may be provided in a middle part of the sealing region SL in a width direction thereof on the counter substrate 30 so as to extend along the sealing region SL and to protrude toward the array substrate 20. For example, plural rows of the raised ribs 33 (e.g., two rows of the raised ribs 33 in FIG. 6) are provided so as to be arranged in the width direction of the sealing region SL. Each of the raised ribs 33 is formed by stacking, e.g., a color filter layer 33a, a transparent conductive film 33b (same as the common electrode 32), and transparent resin 33c. Each of the raised ribs 33 has, e.g., a width of about 50 μm and a height of about 2.5 μm, and is formed such that a cross section thereof in the width direction of the sealing region SL is in a substantially trapezoidal shape. The raised ribs 33 function to reduce overflow of the alignment film of the counter substrate 30 beyond the raised ribs 33 upon the formation of the alignment film. If ribs for liquid crystal alignment restriction are provided in the display region D of the counter substrate 30, the raised ribs 33 and the ribs for liquid crystal alignment restriction can be simultaneously formed. The raised rib 33 may be continuously provided in an annular shape so as to surround the display region D. Alternatively, the raised ribs 33 may be provided in each of regions of the terminal region T where the external connection terminals 60 for connecting the gate lines 22 to external circuits configured to provide electrical potential to the gate lines 22 are provided, along two sides of the terminal region T facing each other.

<Method for Manufacturing Liquid Crystal Display Device>

A method for manufacturing the liquid crystal display device 10 of the present embodiment will be described below.

First, an array substrate 20 and a counter substrate 30 are separately formed by a publicly-known method.

Next, e.g., a dispenser or screen printing is used to apply a second sealing raw material around a display region D so as to surround an outer peripheral part of the counter substrate 30 and apply a first sealing raw material around the outer periphery of the second sealing raw material. At this point, the first and second sealing raw materials may be simultaneously applied, or may be applied at different timing. If the first and second sealing raw materials are sequentially applied, there is no order as to which one of the first and second sealing raw materials is first applied. Although the case where the first and second sealing raw materials are applied onto the counter substrate 30 has been described, the first and second sealing raw materials may be applied onto the array substrate 20. Alternatively, one of the first and second sealing raw materials may be applied onto the array substrate 20, and the other one of the first and second sealing raw materials may be applied onto the counter substrate 30.

Subsequently, e.g., the dispenser is used to drop a liquid crystal material to a region surrounded by the first and second sealing raw materials, and therefore a liquid crystal layer 50 is formed.

Next, the array substrate 20 and the counter substrate 30 are positioned such that the display regions D of the array substrate 20 and the counter substrate 30 are aligned with each other. Then, the substrates 20, 30 overlap with each other with the first and second sealing raw materials being interposed therebetween, and are pressed.

Finally, in such a manner that the first and second sealing raw materials are irradiated with ultraviolet and/or are heated, the first and second sealing raw materials are cured. Subsequently, by using a glass cutter, the glass substrates bonded together as described above are cut into cells, i.e., liquid crystal panels.

The liquid crystal panels are formed in the foregoing manner, and, e.g., the followings are performed to manufacture a liquid crystal display device 10: mounting of a drive module on the liquid crystal panel; and a polarizer is bonded to the liquid crystal panel.

It has been described that, after the first and second sealing raw materials are applied and the liquid crystal layer 50 is dropped, the substrates are bonded together. However, after the first and second sealing raw materials are applied such that a liquid crystal material injection port is formed, the substrates may be bonded together, and the first and second sealing raw materials may be cured. Then, the liquid crystal material may be injected between the substrates to form the liquid crystal layer 50.

Advantages of the Present Embodiment

According to the display device having the foregoing configuration, the second sealing material 42 provided in the region inside relative to the first sealing material 41 does not contain the conductive beads B as the sealing material ingredients. Thus, even if lines and electrodes such as the interconnection electrodes 26 and the common electrode 32 are provided on the array substrate 20 and the counter substrate 30 in the region where the second sealing material 42 is arranged, current does not leak from such components through the conductive beads B, and occurrence of a line defect upon an image display can be reduced.

According to the display device having the foregoing configuration, the second sealing material 42 provided in the region inside relative to the first sealing material 41 does not contain the ground glass fibers G as the sealing material ingredients. Thus, even if lines and electrodes such as the interconnection electrodes 26 and the common electrode 32 are exposed on the substrates in the region where the second sealing material 42 is arranged, damage such as scratching of such components by the glass is not caused.

According to the foregoing configuration, the second sealing material 42 provided in the region inside relative to the first sealing material 41 does not contain the ground glass fibers G as the sealing material ingredients. Thus, even in the case where protrusions etc. are provided on the substrates in the region where the second sealing material 42 is arranged, e.g., the case where the raised ribs 33 etc. are formed, a non-uniform cell thickness is not caused, and excellent display properties can be obtained.

Since the second sealing material 42 which does not contain the sealing material ingredients is arranged in the region inside relative to the first sealing material 41, e.g., the current leakage and damage of the lines and the electrodes and the non-uniform cell thickness as described above can be reduced. Thus, the area of the region between the region where the second sealing material 42 is provided and the display region D can be decreased without degrading the display properties, and therefore the frame region can be narrowed.

The sealing material 40 has the double sealing structure of the first and second sealing materials 41, 42. Thus, even if the narrowing of the frame region is realized by the foregoing configuration, the sealing strength is not decreased, and external air does not enter the region of the liquid crystal layer due to degradation of external air blocking performance of the sealing material 40.

Variations of the Present Embodiment

Figure 7:
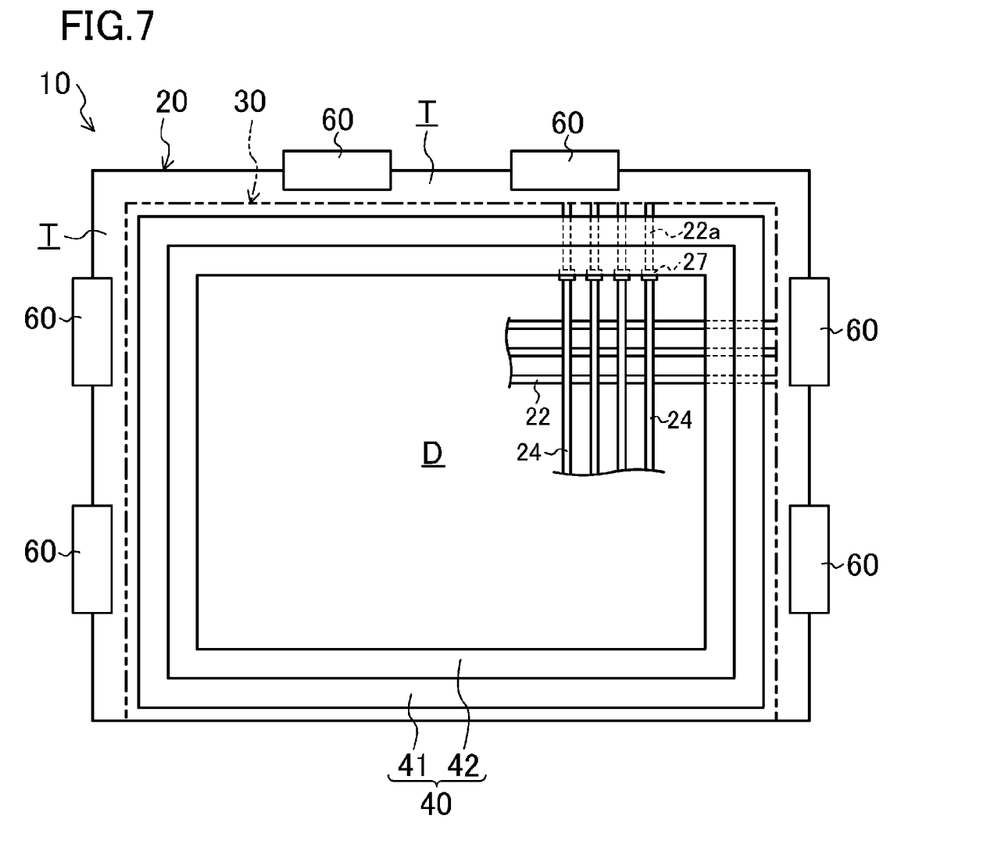
FIG. 7 is a plan view of a liquid crystal display device of a first variation of the embodiment.

In the present embodiment, it has been described that the first sealing material 41 and the second sealing material 42 are arranged at a certain interval in the seal width direction. However, in the display device of the present invention, the first sealing material 41 and the second sealing material 42 may be, as in a first variation illustrated in FIG. 7, continuously arranged in the seal width direction without a clearance. In such a case, since there is no region between the first sealing material 41 and the second sealing material 42, the frame region can be further narrowed. Note that, when the first and second sealing raw materials are applied onto the counter substrate 30, application regions of the first and second sealing raw materials are required to be set such that the following is avoided: the sealing materials are spread by pressing and come into contact with each other, the sealing materials are raised at such a contact part, and the cell thickness cannot be controlled.

In the present embodiment, it has been described that the second sealing material 42 is arranged in the annular shape inside relative to the first sealing material 41 so as to surround the display region D. However, in the display device of the present invention, the second sealing material 42 may be arranged only in a region including the interconnection parts 27. The second sealing material 42 which does not contain the conductive beads B is arranged in the region including the interconnection parts 27. Thus, even if the second sealing material 42 is not arranged in the annular shape so as to surround the outer periphery of the display region D, but part of the second sealing material 42 is arranged at the outer periphery of the display region D, the following disadvantage is less likely to occur: the interconnection electrodes 26 and the common electrode 32 provided on the second substrate leak through the conductive beads B which are present in the region where the interconnection parts 27 are formed, and therefore the line defect is caused upon the image display. In addition, since the second sealing material 42 which does not contain the ground glass fibers G is arranged in the region including the interconnection parts 27, the following disadvantage is less likely to occur: the interconnection electrodes 26 are damaged by the ground glass fibers G which are present in the region where the interconnection parts 27 are formed.

Figure 8:
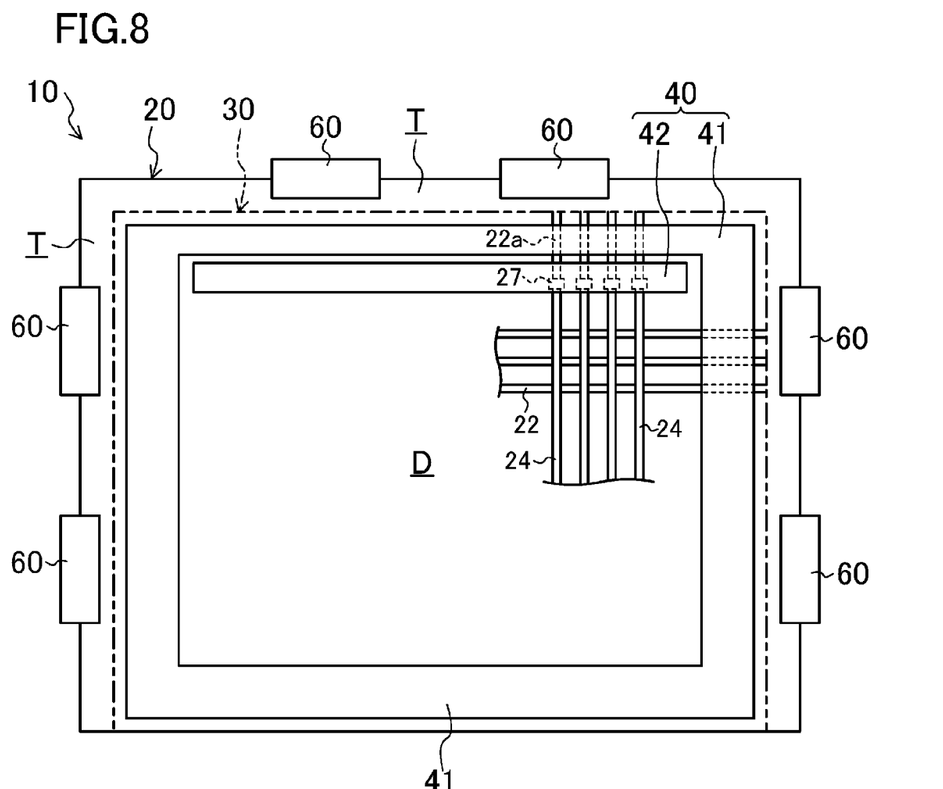
FIG. 8 is a plan view of a liquid crystal display device of a second variation of the embodiment.

If the second sealing material 42 is arranged only in the region including the interconnection parts 27, the first sealing material 41 may be, as in a second variation illustrated in FIG. 8, arranged such that part of the first sealing material 41 arranged corresponding to a region where the second sealing material 42 is not arranged has a seal width greater than that of part of the first sealing material 41 arranged corresponding to a region where the second sealing material 42 is arranged. According to such a configuration, since the first sealing material 41 has a greater seal width even in a region where the second sealing material 42 is not arranged and only part of the sealing material 40 forms the sealing material 40, sufficient reinforcement and external air blocking performance by the sealing material can be ensured.

Figure 9:
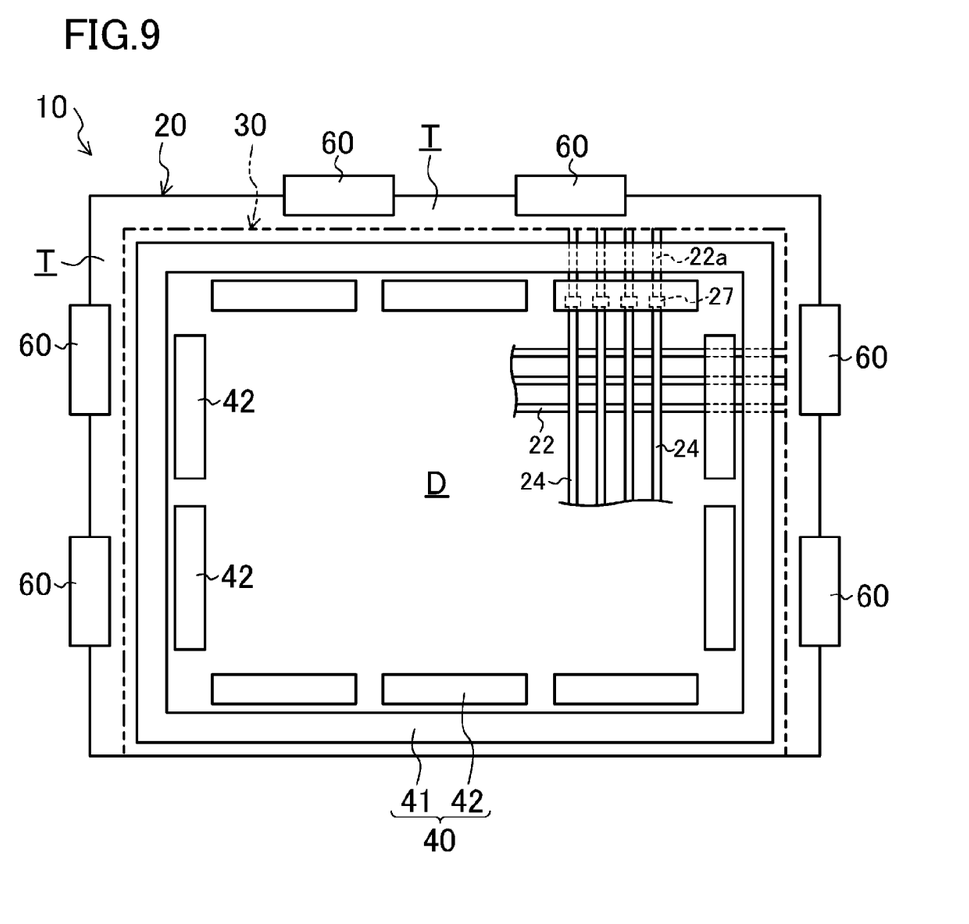
FIG. 9 is a plan view of a liquid crystal display device of a third variation of the embodiment.

In the present embodiment, it has been described that the first sealing material 41 and the second sealing material 42 positioned inside relative to the first sealing material 41 are each arranged so as to be continuously provided in an annular shape at the outer periphery of the display region D. However, the display device of the present invention may be, as in a third variation illustrated in FIG. 9, configured such that the second sealing materials 42 are discontinuously provided in an annular shape inside relative to the first sealing material 41.

In the present embodiment, it has been described that the sealing material 40 has the double sealing structure of the first sealing material 41 and the second sealing material 42. However, the sealing material 40 may have, e.g., a triple sealing structure. In such a case, a sealing material arranged in a region closest to the display region D may be formed so as not to contain the sealing material ingredients.

In the present embodiment, the liquid crystal display device 10 including the liquid crystal display panel has been described as the example of the display device. However, the present invention is applicable to a display device such as a plasma display (PD), a plasma addressed liquid crystal (PALC) display, an organic electroluminescence (organic EL) display, an inorganic electroluminescence (inorganic EL) display, a field emission display (FED), and a surface-conduction electron-emitter display (SED).

INDUSTRIAL APPLICABILITY

The present invention is useful for the display device such as the liquid crystal display device and the method for manufacturing the display device. In particular, the present invention is useful for the narrowing of the frame region.

DESCRIPTION OF REFERENCE CHARACTERS

B Conductive Bead
D Display Region
G Ground Glass Fiber
10 Liquid Crystal Display Device (Display Device)
20 Array Substrate (First Substrate)
22 Gate Line (First Line)
22a Lead Line (Lead Line for Second Line)
24 Source Line (Second Line)
26 Interconnection Electrode
27 Interconnection Part
30 Counter Substrate (Second Substrate)
33 Raised Rib
41 First Sealing Material
42 Second Sealing Material
50 Liquid Crystal Layer

The invention claimed is:

1. A display device, comprising:
a first substrate including
a plurality of first lines extending parallel to each other in a display region, and
a plurality of second lines provided above the first lines with an insulating film being interposed therebetween and extending parallel to each other in the display region; and
a second substrate arranged so as to face the first substrate,
wherein, in an outer peripheral part between the first and second substrates, a first sealing material is arranged in a frame shape so as to surround the display region, the first sealing material containing sealing material ingredients including
(i) a ground glass fiber, or
(ii) the ground glass fiber and a conductive bead, and
in a region inside relative to the first sealing material and outside the display region, a second sealing material containing no said sealing material ingredients is arranged,
the first substrate further includes, in a region outside the display region, a plurality of lead lines for the second lines, which are provided in a layer in which the plurality of first lines are provided and which extend respectively along extensions of the plurality of second lines,
in the region outside the display region, interconnection parts are formed, in each of which each of end parts of the second lines is electrically connected to a corresponding one of the lead lines for the second lines through a contact hole and an interconnection electrode provided along a surface of the contact hole, and
the second sealing material is arranged in a region including the interconnection parts.

2. The display device of claim 1, wherein
the second sealing material is continuously provided in an annular shape so as to surround the display region.

3. The display device of claim 1, wherein
the first and second sealing materials are continuously arranged without a clearance.

4. The display device of claim 1, wherein
the first and second sealing materials are arranged at a predetermined interval.

5. The display device of claim 1, wherein
the second sealing material is not arranged in a region of the outer peripheral part between the first and second substrates where the interconnection parts are not formed, and
a part of the first sealing material arranged corresponding to the region of the outer peripheral part where the second sealing material is not arranged has a seal width greater than that of a part of the first sealing material arranged corresponding to a region where the second sealing material is arranged.

6. A display device, comprising:
a first substrate including a plurality of first lines extending parallel to each other in a display region, and a plurality of second lines provided above the first lines with an insulating film being interposed therebetween and extending parallel to each other in the display region; and a second substrate arranged so as to face the first substrate, wherein, in an outer peripheral part between the first and second substrates, a first sealing material is arranged in a frame shape so as to surround the display region, the first sealing material containing sealing material ingredients including
(i) a ground glass fiber, or
(ii) the ground glass fiber and a conductive bead, and in a region inside relative to the first sealing material and outside the display region, a second sealing material containing no said sealing material ingredients is arranged, and in a middle part of the second sealing material in a width direction thereof on the second substrate, a raised rib is provided along the second sealing material and protrudes toward the first substrate with a clearance from the first substrate.

7. The display device of claim 1, wherein
a liquid crystal layer is provided between the first and second substrates.

8. A method for manufacturing a display device in which a first substrate and a second substrate face each other, the method comprising:

arranging, on an outer peripheral part of one of the first and second substrates, a first sealing raw material in a frame shape, the first sealing raw material containing sealing material ingredients including
(i) a ground glass fiber, or
(ii) the ground glass fiber and a conductive bead;

arranging, on one of the first and second substrates, a second sealing raw material containing no sealing material ingredients in a region inside relative to a region where the first sealing raw material is arranged and outside a display region; and obtaining, by curing the first and second sealing raw materials in a state in which the first and second substrates are stacked on each other with the first and second sealing raw materials being interposed therebetween, the display device in which a first sealing material containing the sealing material ingredients is arranged in the frame shape in an outer peripheral part between the first and second substrates so as to surround the display region and a second sealing material containing no said sealing material ingredients is arranged in the region inside relative to the first sealing material and outside the display region, wherein the first substrate further includes, in a region outside the display region, a plurality of lead lines for the second lines, which are provided in a layer in which the plurality of first lines are provided and which extend respectively along extensions of the plurality of second lines, in the region outside the display region, interconnection parts are formed, in each of which each of end parts of the second lines is electrically connected to a corresponding one of the lead lines for the second lines through a contact hole and an interconnection electrode provided along a surface of the contact hole, and the second sealing material is arranged in a region including the interconnection parts.

9. The method of claim 8, wherein
the first and second sealing raw materials are arranged on one of the first and second substrates.

10. A display device, comprising:
a first substrate including:
a plurality of first lines extending parallel to each other in a display region, and
a plurality of second lines provided above the first lines with an insulating film being interposed therebetween and extending parallel to each other in the display region; and a second substrate arranged so as to face the first substrate, wherein, in an outer peripheral part between the first and second substrates, a first sealing material containing sealing material ingredients including a ground glass fiber and/or a conductive bead is arranged in a frame shape so as to surround the display region, in a region inside relative to the first sealing material and outside the display region, a second sealing material containing no said sealing material ingredients is arranged, and in a middle part of the second sealing material in a width direction thereof on the second substrate, a raised rib is provided along the second sealing material and protrudes toward the first substrate with a clearance from the first substrate.

* * * * *